(12) United States Patent
Leitner et al.

(10) Patent No.: US 10,977,363 B2
(45) Date of Patent: Apr. 13, 2021

(54) DETECTING SYNTHETIC ONLINE ENTITIES

(71) Applicant: EQUIFAX, INC., Atlanta, GA (US)

(72) Inventors: Stephen Leitner, Alpharetta, GA (US); Mark Burgess, Alpharetta, GA (US); Keith Manthey, Alpharetta, GA (US); Steven Hicklin, York (GB)

(73) Assignee: EQUIFAX INC., Atlanta, GA (US)

( * ) Notice: Subject to any disclaimer, the term of this patent is extended or adjusted under 35 U.S.C. 154(b) by 133 days.

(21) Appl. No.: 15/558,691

(22) PCT Filed: Mar. 24, 2016

(86) PCT No.: PCT/US2016/023982
§ 371 (c)(1),
(2) Date: Sep. 15, 2017

(87) PCT Pub. No.: WO2016/154419
PCT Pub. Date: Sep. 29, 2016

(65) Prior Publication Data
US 2018/0114017 A1      Apr. 26, 2018

Related U.S. Application Data

(60) Provisional application No. 62/138,219, filed on Mar. 25, 2015.

(51) Int. Cl.
*G06F 21/55* (2013.01)
*H04W 4/021* (2018.01)
(Continued)

(52) U.S. Cl.
CPC .......... *G06F 21/554* (2013.01); *H04W 4/022* (2013.01); *G06F 16/955* (2019.01);
(Continued)

(58) Field of Classification Search
CPC ............................ G06F 21/554; H04W 4/022
See application file for complete search history.

(56) References Cited

U.S. PATENT DOCUMENTS 8,566,234 B2   10/2013   Hoefelmeyer et al.
10,342,052 B1 *  7/2019   Amiri .................... H04W 48/04
(Continued)

OTHER PUBLICATIONS

Adrian Banarescu, "Emerging Markets Queries in Finance and Bisiness Detecting and Preventing Fraud with Data Analytics," pp. 1827-1836, 2015.*

(Continued)

*Primary Examiner* — Luu T Pham
*Assistant Examiner* — Canh Le
(74) *Attorney, Agent, or Firm* — Kilpatrick Townsend & Stockton LLP

(57) ABSTRACT

Examples are disclosed for detecting synthetic online entities that may be used for fraudulent purposes or other purposes. In some aspects, a computing system can generate a data structure that includes nodes and links between the nodes. The nodes can represent online entities and the links can represent geographic associations or transactional associations between pairs of online entities. These associations can be identified from electronic transactions involving the online entities. The computing system can determine, from the links between the nodes, that a degree of connectivity among a subset of the nodes exceeds a threshold connectivity. The degree of connectivity indicates electronic communications involving online entities represented by the subset of the nodes. The computing system can transmit, based on the degree of connectivity exceeding the threshold connectivity, an alert indicating a potential synthetic entity (e.g., potentially fraudulent activity) within the subset of the nodes.

9 Claims, 6 Drawing Sheets

(51) Int. Cl.
  *G06F 16/955*    (2019.01)
  *H04L 29/08*     (2006.01)
  *H04W 4/02*      (2018.01)
  *H04W 84/18*     (2009.01)
  *G06Q 30/00*     (2012.01)

(52) U.S. Cl.
  CPC ..... *G06F 2221/034* (2013.01); *G06Q 30/018* (2013.01); *H04L 67/02* (2013.01); *H04L 67/18* (2013.01); *H04W 4/027* (2013.01); *H04W 84/18* (2013.01)

(56) References Cited

U.S. PATENT DOCUMENTS

| | | | | |
|---|---|---|---|---|
| 2007/0061339 | A1* | 3/2007 | Douglet | G06F 16/9577 |
| 2008/0109392 | A1* | 5/2008 | Nandy | G06N 5/02 |
| | | | | 706/47 |
| 2008/0110982 | A1* | 5/2008 | Song | G06Q 30/0601 |
| | | | | 235/381 |
| 2011/0055921 | A1* | 3/2011 | Narayanaswamy | |
| | | | | H04L 63/1458 |
| | | | | 726/22 |
| 2012/0016633 | A1 | 1/2012 | Wittenstein et al. | |
| 2014/0258160 | A1 | 9/2014 | Chrapko et al. | |
| 2016/0020979 | A1* | 1/2016 | Thubert | H04L 43/062 |
| | | | | 370/252 |
| 2018/0013789 | A1* | 1/2018 | Damian | G06F 16/9535 |

OTHER PUBLICATIONS

Crista Code et al. "Decision Tree Learning for Fraud Detection in Consumer Energy Consumption," p. 1175-1179, 2015.*
International Patent Application No. PCT/US2016/023982, International Search Report and Written Opinion, dated Jul. 1, 2016, 11 pages.
Bae Systems, Application Fraud and Accouint Monitoring, available at htttp://www.baesystems.com/en/cybersecurity/download-en/cybersecurity/20160810114546/1434584763351.pdf, retrieved on Sep. 15, 2017, 12 pages.
Bae Systems, Defend your Business with a Fully Managed NetReveal Service, available at http://www.baesystems.com/en/cybersecurity/download-csai/resource/uploadFile/143456934289, retrieved on Sep. 15, 2017, 2 pages.
"Bae Systems Netreveal on Demand", Bae Systems, G-Cloud Service Definition, 14 pages.
"Comprehensive Monitoring & Reporting of Suspicious Activity", Nice Actimize, Fighting Financial Crime, 4 pages.
"Detica Netreveal on Demand", BAE Systems Detica, G-Cloud Service Definition, 13 pages.
"NICE Actimize Blog—Financial Crime Risk and Compliance Thought Leadership", Available online at: https://web.archive.org/web/20150315002020/http:/www.niceactimize.com/blog, Accessed on May 23, 2018, 3 pages.
Hancock et al., "Cyber Security in the Digital Oilfield A Practical Perspective", Available online at :http://53688cd8d54a0032872d-0333f58e7ba7391207de563bde7b2526.r70.cf1.rackcdn.com/detica.pdf, Dec. 4, 2012, 22 pages.

* cited by examiner

DETECTING SYNTHETIC ONLINE ENTITIES

CROSS-REFERENCE TO RELATED APPLICATIONS

This is a U.S. national phase under 35 U.S.C. 371 of International Patent Application No. PCT/US2016/023982, titled "Detecting Synthetic Online Entities" and filed Mar. 24, 2016, which claims priority to U.S. Provisional Application No. 62/138,219, entitled "Detection of Synthetic Identities Using Data Graphs," filed Mar. 25, 2015, the entirety of each of which is hereby incorporated by reference.

TECHNICAL FIELD

This disclosure relates generally to cybersecurity, and more particularly to detecting synthetic online entities, such as (but not limited to) false entities established with online services for fraudulent purposes.

BACKGROUND

Electronic transactions involve exchanges of products and services among different parties. For example, one entity may provide business credit, investment services, banking services, product supplies, manufacturing services, or any other type of product or service to one or more other entities.

Individuals engaging in fraud or other unauthorized online activity may create deep, fake entities. For example, a synthetic entity may be generated by creating fake documentation such as fake birth certificates, fake Social Security numbers, etc. Therefore, the synthetic entity may be associated with mortgages, credit cards, or other financial transactions.

A synthetic online entity can pose risks that are absent from other types of fraudulent activity. For example, outside the realm of electronic transactions, the same individual could not simultaneously pose as a first individual applying for a loan and a second individual co-signing on a loan without drawing suspicion. But a first synthetic online entity and a second synthetic online entity could perform the same transaction without appearing suspicious to the automated computing system that services the loan application. Thus, individuals that have created synthetic entities can use the relative anonymity provided by the Internet to fraudulently apply for mortgages or credit cards, to conduct clandestine activities, or to engage in other illicit or otherwise unauthorized activities.

SUMMARY

Aspects and examples are disclosed for detecting synthetic online entities. In some aspects, a computing system can generate a data structure that includes nodes and links between the nodes. The nodes can represent online entities and the links can represent geographic associations or transactional associations between pairs of online entities identified from electronic transactions involving the online entities. The computing system can determine, from the links between the nodes, that a degree of connectivity among a subset of the nodes exceeds a threshold connectivity. The degree of connectivity indicates electronic communications involving a subset of the online entities represented by the subset of the nodes. The computing system can transmit, based on the degree of connectivity exceeding the threshold connectivity, an alert indicating a potential synthetic entity (e.g., potentially fraudulent activity) within the subset of the nodes.

This illustrative example is mentioned not to limit or define the invention, but to aid understanding thereof. Other aspects, advantages, and features of the present invention will become apparent after review of the entire description and figures, including the following sections: Brief Description of the Figures, Detailed Description, and Claims.

DETAILED DESCRIPTION

Figure 1:
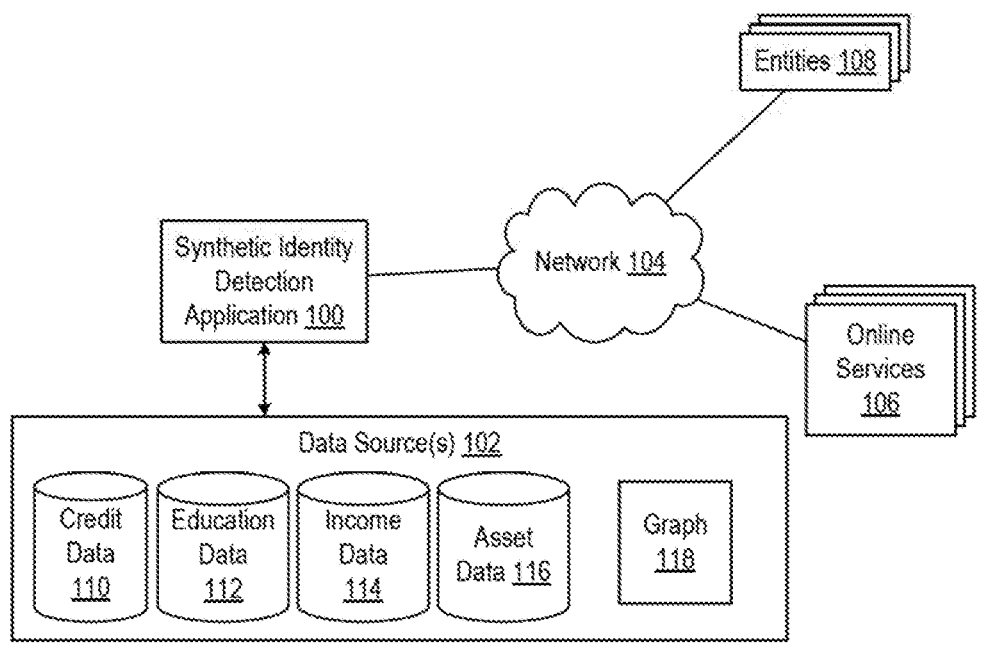
FIG. 1 is a block diagram illustrating an example of a computing environment that includes a synthetic entity detection application according to some aspects of the present disclosure.

Certain aspects and features relate to detecting synthetic online entities. A synthetic entity detection application can analyze clusters of data associated with multiple online entities. The synthetic entity detection application can determine, based on the analysis, that an amount of interconnection among the entities indicates that one or more of the entities may be synthetic. A synthetic entity can be an entity that does not correspond to a real individual. Non-limiting examples of a synthetic entity include entities specified in fraudulent credit accounts, fraudulent store accounts, fraudulent entity documents, etc. The synthetic entity detection application can be used to detect that one or more individuals are manufacturing synthetic entities. These synthetic entities can be used for the purposes of first party fraud or third party fraud.

For example, a computing system that executes a synthetic entity detection application may electronically receive credit information associated with entities who use credit to make online purchases, make electronic payments, or engage in other financial or commercial transactions via a data network. The credit information may be stored in any suitable data structure, such as (but not limited to) a database, a data graph, etc. The synthetic entity detection application can generate a data graph or other suitable data structure used to analyze the stored data. A data graph can include nodes representing online entities and connections between nodes representing associations between the entities, such as (but not limited to), geographic locations common to multiple entities, electronic communications between the online entities, or other online activities involving multiple entities.

The data graph or other suitable data structure can be used to determine that the entities exhibit synthetic characteristics (e.g., online activity performed solely for the purpose of creating a fraudulent identity). For example, degrees of connection between different entities may not be consistent with regional averages for a geographic region or customizable threshold values. The connections that exhibit characteristic indicative of synthetic entities may be reviewed by an analyst for further analysis with respect to possibly fraudulent or otherwise illicit behavior. The synthetic entity detection application can provide an alert of potential synthetic identities to a computing device used by an analyst, who can refer the results of the analysis to an appropriate entity for further inquiry.

In some aspects, connections that exhibit characteristic indicative of synthetic entities include connections in which the level, density, or other amount of connectedness appears to deviate from expected characteristics of a profile associated with an actual human user. These deviations can indicate synthetic entities. In additional or alternative aspects, connections that exhibit characteristics indicative of synthetic entities include connections where the velocity of connectedness appear to be deviate from expected characteristics of a profile associated with an actual human user. The profiles having characteristics that deviate from expected characteristics of a profile associated with an actual human user can be identified as hyper-connected sets of nodes.

In some aspects, the synthetic entity detection application prevents individuals from using the relative anonymity provided by Internet-based communications to effectively use synthetic online entities that would otherwise be detected by in-person transactions. For example, the Internet allows one individual to pose as multiple individuals performing involved in multiple, contemporaneous transactions with the same institution without detection so long as unique credentials are provided for each "individual." While an alert employee of the institution could detect this fraudulent in-person activity (e.g., by recognizing the same individual using different names), online communications prevent such face-to-face interactions from detecting fraudulent activities or other illicit activities. But, as described herein, a synthetic entity detection application can address these challenges, which are unique to the Internet and other data networks, by analyzing electronic activities for unusual levels of interconnectivity and thereby providing alerts of potentially synthetic identities.

The features discussed herein are not limited to any particular hardware architecture or configuration. A computing system can include any suitable arrangement of components that provide a result conditioned on one or more inputs. Suitable computing systems include multipurpose, microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing system.

Referring now to the drawings, FIG. 1 is a block diagram illustrating an example of a computing environment that includes a synthetic entity detection application 100. The synthetic entity detection application 100 can be used to analyze the interconnectivity among entities 108 involved in electronic transactions with online services 106. An online service 106 can include computing resources, including computing systems that may be configured for distributed processing operations, that provide one or more applications accessible via a data network. The collection of computing resources can be represented as a single service. The online services 106 can supply products or services to consumers or other users.

The synthetic entity detection application 100 can include executable instructions that are executed on one or more computing devices. The synthetic entity detection application 100 can access data stored in data sources 102. The data sources 102 can include databases or other data structures stored in a non-transitory computer-readable medium that is accessible to the synthetic entity detection application 100. The data sources 102 can include credit data 110, education data 112, income data 114, asset data 116, or any other type of data generated from electronic transactions with the online services 106.

The data sources 102 can include, for example, secure and credentialed databases accessible to a computing system that executes the synthetic entity detection application 100. The data sources 102 can include internal databases or other data sources that are stored at or otherwise accessible to the computing system. The data sources 102 can also include external databases that are accessible via external networks. Non-limiting examples of data stored in the data sources include verified credit data, verified tax data, verified asset data (e.g., property records or verified data regarding other assets possessed by a client), and other types of verified subscriber information.

In some aspects, the data sources 102 (which may include internal or external databases) may be data storage devices controlled, at least in part, by one or more users of the synthetic entity detection application 100. The data sources 102 can be updated periodically or continuously. In other aspects, the internal or external databases are controlled by an entity other than the users of the synthetic entity detection application 100.

A computing system that executes an online service 106 can electronically communicate with one or more computing systems associated with the entities 108 via one or more data networks 104. For example, an online service 106 can receive requests from one or more of the entities 108 to establish one or more subscriber accounts 106. The online service can establish the subscriber accounts by storing authentication information (e.g., user names, passwords, etc.) that can be used to authenticate one or more of the entities 108. Subsequent to establishing the subscriber accounts, the online service 106 can authenticate one or more users representing one or more of the entities 108. If the users are properly authenticated, the online service can communicate with the entities 108 to generate transaction data.

In some aspects, the synthetic entity detection application 100 can include or communicate with one or more of a web server module, a web services module, and an enterprise services module. For example, a web server module can be executed by a suitable processing device to provide one or more web pages or other interfaces to a computing system operated by one of the entities. The web services module can generate this content by executing one or more analytical algorithms using information retrieved from one or more of the data sources. The enterprise services module can be executed to retrieve the information from one or more of the data sources accessible by the synthetic entity detection application 100.

The synthetic entity detection application 100 can access transaction data stored in the data sources 102 to generate a data graph 118 that identifies connections or other relationships among different entities. The data graph 118 allows for multiple similar entities to be associated with one another across multiple dimensions with multiple degrees of freedom. Different components of an entity's entity, such as names, addresses, e-mails, etc. can be separately associated with one another via the data graph 118. The data graph 118 can provide a large mesh of data spanning multiple dimensions.

The transaction data stored in the data source 102 can be obtained from the online services 106. Any suitable data storage system can be used to implement the data sources 102. One example of a suitable data storage system is an NoDB database system.

Data can be layered on top of, or otherwise combined with, a data graph 118. The additional data can be used to create one or more additional dimensions within the data graph 118. Examples of additional data include data identifying deceased individuals, credit data, employment data, marketing data, investment data, etc. Although FIG. 1 depicts the use of a data graph 118, other suitable data structures that indicate degrees of connectivity among online entities can also be used.

In some aspects, a data graph 118 or other suitable data structure that may be analyzed by the synthetic entity detection application 100 may be graphically displayed using graphic software. Non-synthetic entities engaged in typical financial activity or other bona fide activity may be associated with one or more patterns within the data graph 118 that are indicative of a non-synthetic entity (e.g., a "real" individual). These patterns may vary based on the data sources used to obtain information associated with different entities. In some aspects, these patterns can be characterized by having open, semi-sparse graphs and having a number of edges or other connections between nodes or other points of the data graph that is less than a threshold number of edges or other connections.

Figure 2:
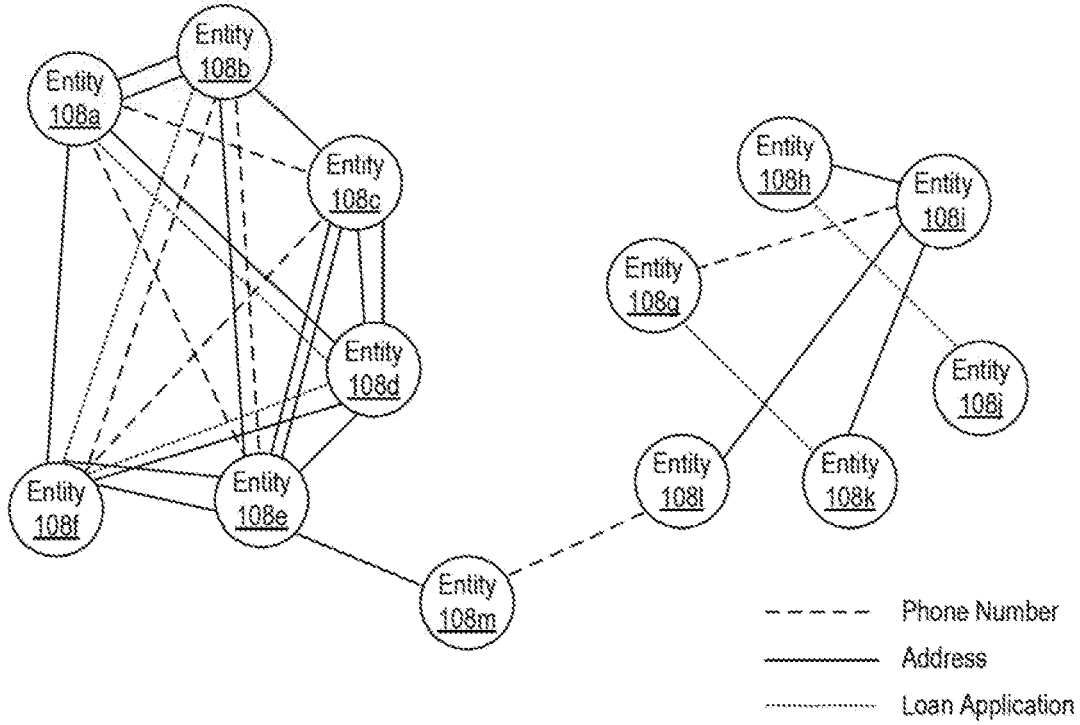
FIG. 2 is a diagram illustrating an example of a data graph used by the synthetic entity detection application of FIG. 1 to identify levels of connectivity among online entities that indicate synthetic entities according to some aspects of the present disclosure.

FIG. 2 is a diagram illustrating a simplified example of a data graph 118. The data graph 118 includes nodes representing entities 108a-m. A line between a pair of nodes can indicate that one or more transactions have occurred in which the data from both nodes was involved. In the example depicted in FIG. 2, one node may be connected to another node if the two individuals represented by the node share phone numbers (indicated by a dashed line), addresses (indicated by a solid line), loan applications (indicated by a dotted line), etc. For instance, a node corresponding to one entity may be connected to a node corresponding to another entity if the online services 106 received data indicating a shared address between the entities (e.g., a first individual located at an address being connected to a second individual who previously lived at the address). In another example, a node corresponding to one entity may be connected to a node corresponding to another entity if the two entities accessed an online service 106 to apply for or co-sign on a loan.

The synthetic entity detection application 100 can determine whether patterns associated with entity data or other data including personally identifiable information deviate from expected patterns. For example, patterns associated with synthetic entity data or other data including personally identifiable information may involve deeply connected clusters of nodes such that the nodes are "hyper-connected." Hyper-connected nodes can include nodes having a number of edges or other connections between the nodes that is greater than a threshold number of edges or other connections. In some aspects, this hyper-connectivity can result from a limited amount of data points connecting the fraudulent activity to bona fide or otherwise authorized activities.

In the simplified example of FIG. 2, the entities 108a-f exhibit a higher level of connectivity than the entities 108g-m. For example, the nodes corresponding to the entities 108a-f have multiple links indicating common phone numbers, addresses, and loan applications. By contrast, the links among the entities 108g-m exhibit a sparser level of connectivity. This reduced level of connectivity may indicate that the online entities 108g-m are more likely to be real individuals as compared to the entities 108a-e.

Criteria used to distinguish between a normal level of connectedness and hyper-connectedness can be specific to the underlying datasets used for synthetic entity detection. For example, in some datasets, a 6:1 ratio of edges to nodes may be a minimal level hyper-connectedness indicative of deviations from expected behavior, and in other data sets, a larger ratio (e.g., 20:1) of edges to nodes may be a minimal level hyper-connectedness indicative of deviations from expected behavior.

Although the present disclosure describes hyper-connectedness as indicative of potential synthetic entities, hyper-connectedness can also be indicative of other types of fraudulent behavior in addition to or instead of synthetic entities. Additionally or alternatively, detection of potentially synthetic entities may be indicative of the potential for fraudulent behavior in addition to or instead of fraudulent behavior that has occurred. For example, the construction of a synthetic entity that is intended for fraudulent uses may be detected prior to the synthetic entity being successfully used to commit fraud.

Although the present disclosure describes hyper-connectedness as indicative of potential synthetic entities, hyper-connectedness can also be indicative of non-fraudulent behavior. For example, hyper-connectedness may be indicative of a deficiency in one or more systems involving entity data or other data including personally identifiable information. For instance, a large network of individuals associated with a specific address may indicate that systems used by a financial institution are deviating from effective practices (e.g., a set of regulations known as "Know Your Customer," anti-money laundering ("AML") processes, etc.).

Excessive densities in a data graph can indicate potential fraud or other anomalous data. The data in a data graph can also be analyzed over time to identifies trends. For example, if densities of edges have unusual growth patterns, these growth patterns may indicate the use of different synthetic entities to create artificial connections with one another. Such artificial connections with one another may reflect an effort by parties engaging in fraud to make the synthetic entities appear genuine.

Figure 3:
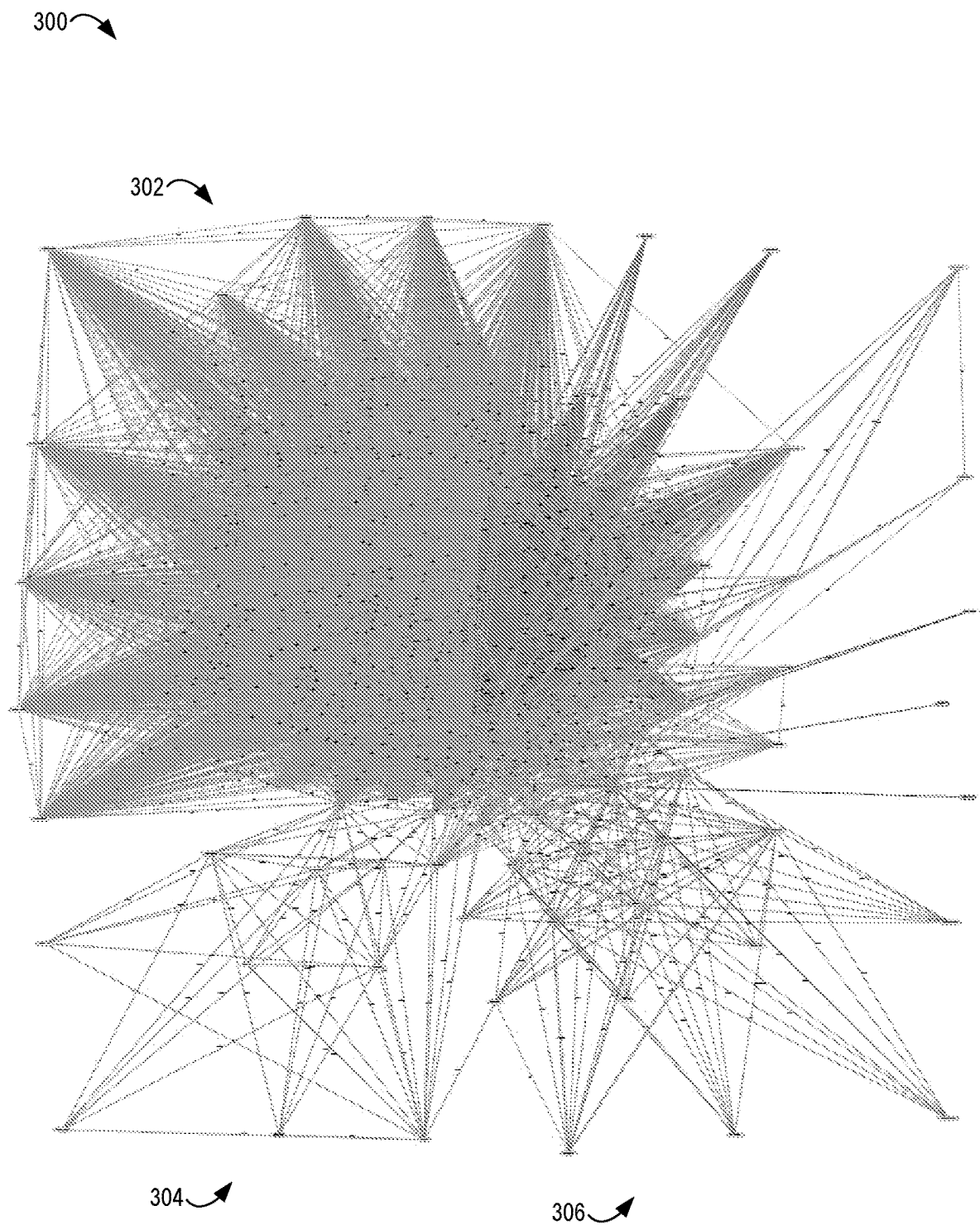
FIG. 3 is a diagram illustrating an example of a data graph with high levels of connectivity among online entities indicative of synthetic entities according to some aspects of the present disclosure.

Although FIG. 2 depicts a simplified example of a data graph 118 for illustrative purposes, a synthetic entity detection application 100 can be used to analyze large numbers of transactions among large numbers of online entities. The number of transactions used to identify potentially synthetic entities activity may be so numerous as to prevent detection of these synthetic entities without the use of computing systems that can analyze large numbers of interconnected nodes. For example, FIG. 3 is a diagram illustrating an example of a data graph 300 with high levels of connectivity among online entities indicative of synthetic entities. The graph 300 includes hyper-connected data in region 302, which indicates synthetic entities (e.g., an unbelievable number of people sharing an address or co-signing each other's loans). By contrast, the sparsely connected data in regions 304 and 306 is less likely to be associated with synthetic identities.

Figure 4:
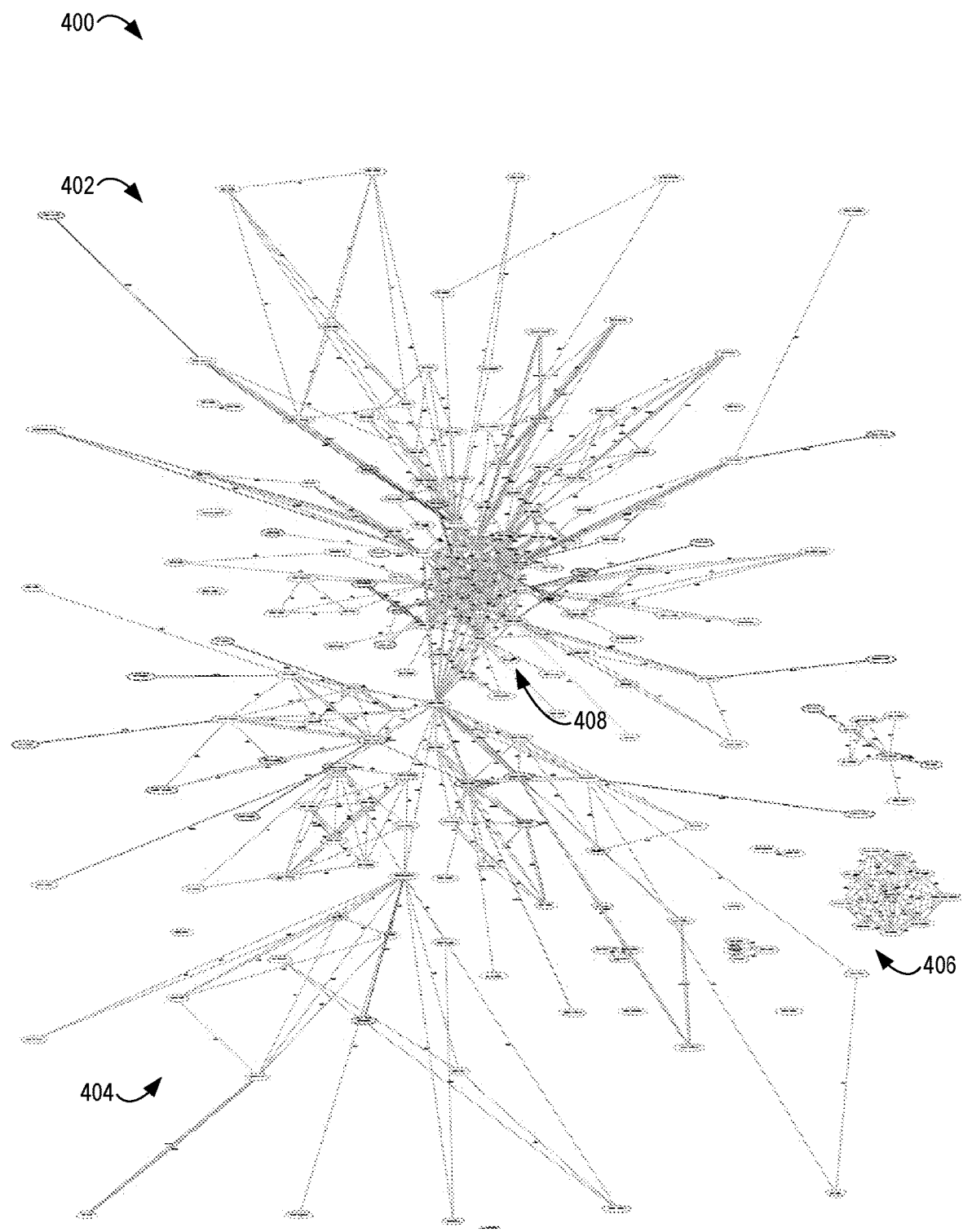
FIG. 4 is a diagram illustrating an example of a data graph with high levels of connectivity among certain online entities indicating synthetic entities and lower levels of connectivity indicating bona fide entities according to some aspects of the present disclosure.

In some aspects, high levels of connectivity can coexist with normal levels of connectivity. For example, FIG. 4 is a diagram illustrating an example of a data graph 400 with high levels of connectivity among certain online entities indicative of synthetic entities and lower levels of connectivity indicative of bona fide entities. In the graph 400, the portions 402, 404 include lower levels of connectivity among nods that indicate a higher likelihood of bona fide entities being associated with those nodes. By contrast, the tightly spaced group of nodes in the portions 406, 408 are hyper-connected nodes that may indicate synthetic entities.

Figure 5:
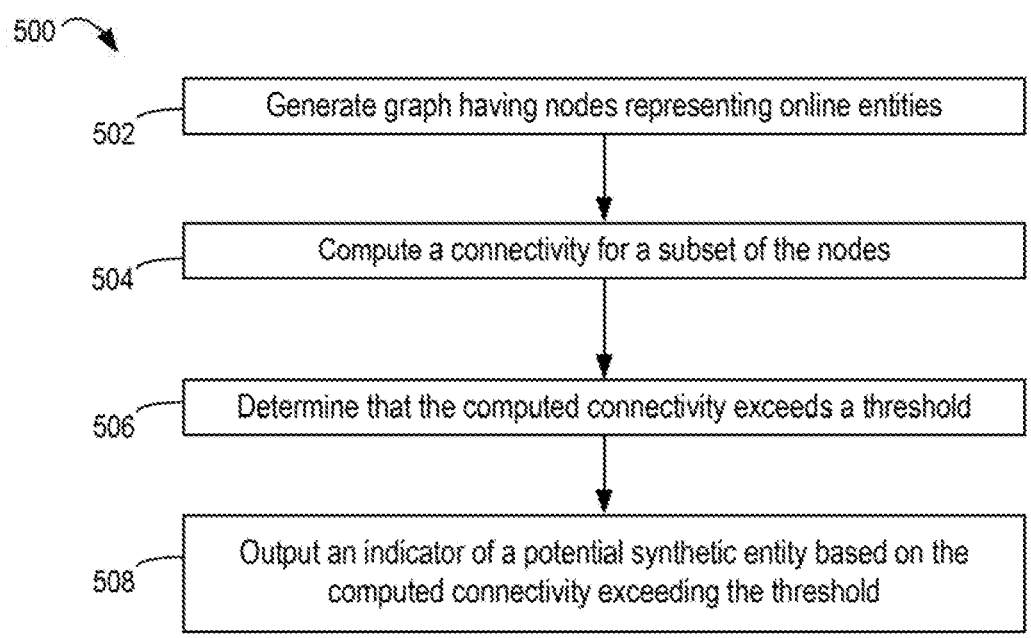
FIG. 5 is a flow chart illustrating an example of a process for detecting synthetic online entities according to some aspects of the present disclosure.

The synthetic entity detection application 100 can execute one or more algorithms for identifying and evaluating the interconnectivity among the entities 108. FIG. 5 is a flow chart illustrating an example of a process 500 for detecting synthetic online entities according to some aspects of the present disclosure. For illustrative purposes, the process 500 is described with reference to the implementations depicted in FIGS. 1-4. Other implementations, however, are possible.

The process 500 can involve generating a data graph or other suitable data structure having nodes representing online entities, as depicted in block 502. The data structure (e.g., one of the data graphs 118, 300, or 400) can include or otherwise indicate links connecting pairs of nodes. The links can represent, for example, geographic associations or transactional associations between pairs of online entities.

The synthetic entity detection application 100 can be executed by a suitable processing device to perform one or more operations for implementing block 502. The operations may include, for example, obtaining transaction data via a data network 104 from servers associated with multiple online services 106. This transaction data can be stored in one or more of the data sources 102. The transaction data can describe electronic transactions between the online services and online entities. The synthetic entity detection application 100 can access the transaction data from a database or other suitable data structure stored in a non-transitory computer-readable medium.

The operations for generating a data graph or other suitable data structure can also include identifying discrete online entities from the obtained transaction data. For example, the synthetic entity detection application 100 or other suitable application can identify names, addresses, email addresses, social security numbers, user names, or other identifiers in the records within the transaction data. The synthetic entity detection application 100 or other suitable application can group together subsets of records of transaction data and associate them with certain online entities. For example, the synthetic entity detection application 100 or other suitable application can apply a reference number to each entity within the transaction data. In some aspects, the reference number can be a semi-persistent key, a persistent unique key, a variable key or unique identifier.

The synthetic entity detection application 100 or other suitable application can associate various different identifiers in transaction data (e.g., names, social security numbers, email addresses) with a common online entity in a database or other data structure. For instance, if the synthetic entity detection application 100 determines that a user name involved in a first online transaction record corresponds to the same online entity as an email address involved in a second online transaction record, the electronic transactions described by the first and second records can be associated with the same online entity.

The synthetic entity detection application 100 or other suitable application can join multiple permutations of information associated with a given entity having a given reference number or other identifier. Examples of such information include changes of address, name changes due to marriage or other event, etc. The synthetic entity detection application 100 or other entity resolution system can maintain a persistent key corresponding to a given entity.

In some aspects, the synthetic entity detection application 100 or other suitable application can generate a data graph or other suitable data structure for analyzing connectivity using entity facets and entity keys. Examples of entity facets include one or more names of entities, one or more addresses for entities, etc. The synthetic entity detection application 100 or other suitable application can maintain a derived set of facets and entity keys that are used to build a set of edges and nodes for a data graph or other suitable data structure. This derived information can be staged in a graph database for online or offline query analysis. For example, a computing system, which executes the synthetic entity detection application 100 or another suitable application, can receive data indicating an online transaction. The computing system can decompose data elements of the online transaction data into facets (e.g., name keys, address keys, account keys, phone keys, etc.). The computing system can use these facets to extract node and edge relationships from the graph databases. This information can be consumed by a graph analysis engine executed by the computing system (e.g., a graph analysis engine included in or accessible by the synthetic entity detection application 100 or other suitable application). The synthetic entity detection application 100 or other suitable application can thereby process online queries for multiple online transactions (e.g., all online transactions or a subset that may have been identified by one or more flagged warnings).

The process 500 can also involve computing a degree of connectivity for a subset of the nodes, as depicted in block 504. The computed connectivity can indicate electronic communications involving a subset of the online entities represented by the subset of the nodes. In some aspects, the degree of connectivity can be a numerical value indicating how interconnected the nodes are. For example, a degree of connectivity may be a node-to-link ratio. In other aspects, the degree of connectivity can be a descriptive value (e.g., "high," "moderate," "low") indicating how interconnected the nodes are.

In some aspects, a degree of connectivity among nodes can be based on the combination of density of edges and a weight value of the type of edge connections. For example, an "address" type of connection between nodes may have a lower weight because of noise resulting from linkages for roommates, data cleanliness, insufficient address information etc. But a connection based on one or more of "account number," "social security number," and "cell phone number" may have a higher weight because each of these types of connections are more likely to correspond to a specific person. Thus, a detection of strongly weighted information between multiple entities who do not seem to be related and do not reside near one another can be representative of a potential fraud patterns or other patterns indicative of synthetic entities. Different types of synthetic entity patterns can be exposed by the weighted intersection of nodes.

The synthetic entity detection application 100 can be executed by a suitable processing device to perform one or more operations for implementing block 504. For example, the processing device can execute one or more suitable algorithms for determining node edge density or density-based spatial clustering for the nodes in the data graph.

The process 500 can also involve determining that the computed connectivity exceeds a threshold, as depicted in block 506. The synthetic entity detection application 100 can be executed by a suitable processing device to perform one or more operations for implementing block 506. For example, the synthetic entity detection application 100 can determine, based on the analysis performed at block 504, that an amount of connectivity among the nodes and their associated online entities indicates one or more of the entities being synthetic.

In some aspects, the synthetic entity detection application 100 can use a threshold connectivity that is specific to a particular geographic region. For example, degrees of connection between different entities may not be consistent with regional averages for a geographic region. The synthetic entity detection application 100 can identify a geographic region associated with the subset of the online entities. The geographic region can be identified by accessing the transaction data used to identify associations between nodes. The synthetic entity detection application 100 can select a threshold connectivity specific to the geographic region from a suitable data structure. The synthetic entity detection application 100 can compare the computed connectivity with the threshold connectivity for the geographic region to determine if the computed connectivity exceeds the threshold connectivity.

In additional or alternative aspects, the synthetic entity detection application 100 can determine that a connectivity among nodes has a velocity that deviates from expected characteristics of a profile associated with an actual human user. The velocity of connectivity can be, for example, a number of connections among nodes associated with a certain time period. For instance, if two entities are both associated with a large number of online transactions within a given time period, these transactions may indicate that one or more of the entities are synthetic.

To determine the velocity of connectivity, the synthetic entity detection application 100 can identify a time period associated with a subset of the links among the subset of the online entities. The time period can be determined, for example, by accessing the transaction data used to generate the data graph to determine when the online transactions corresponding to the links occurred. The synthetic entity detection application 100 can determine a velocity of connectivity based on the number of links and the identified time period. The synthetic entity detection application 100 can compare the determined velocity of connectivity to a threshold velocity of connectivity and thereby determine whether the connectivity among the nodes exceeds a threshold connectivity.

The process 500 can also involve outputting an indicator of a potential synthetic entity based on the computed connectivity exceeding the threshold, as depicted in block 508. For example, the synthetic entity detection application 100 can be executed by a suitable processing device to perform one or more operations for implementing block 508.

In some aspects, the synthetic entity detection application 100 can output the indicator by transmitting the indicator to a computing device via a data network. For example, synthetic entity detection application 100 can configure a server to transmit an alert (e.g., an email, a text message, a graphical interface message, etc.) to a computing device used by an analyst or other suitable operator. The computing device can be a server used by one or more online services from which transaction data is obtained or a third-party analytical service.

In additional or alternative aspects, the synthetic entity detection application 100 can output the indicator by displaying a suitable alert or other visual indicator in a graphical interface. For example, the synthetic entity detection application 100 can configure a processing device to display the data graph (e.g., one or more of the graphs 118, 300, 400) in a graphical interface. At block 508, the synthetic entity detection application 100 can update the graphical interface to include a visual indicator of the connectivity exceeding the threshold connectivity. For instance, if the graphical interface depicts the graph 300, the region 302 can be highlighted, circled, or otherwise visually indicated to indicate that the connectivity in this region exceeds a threshold connectivity.

Figure 6:
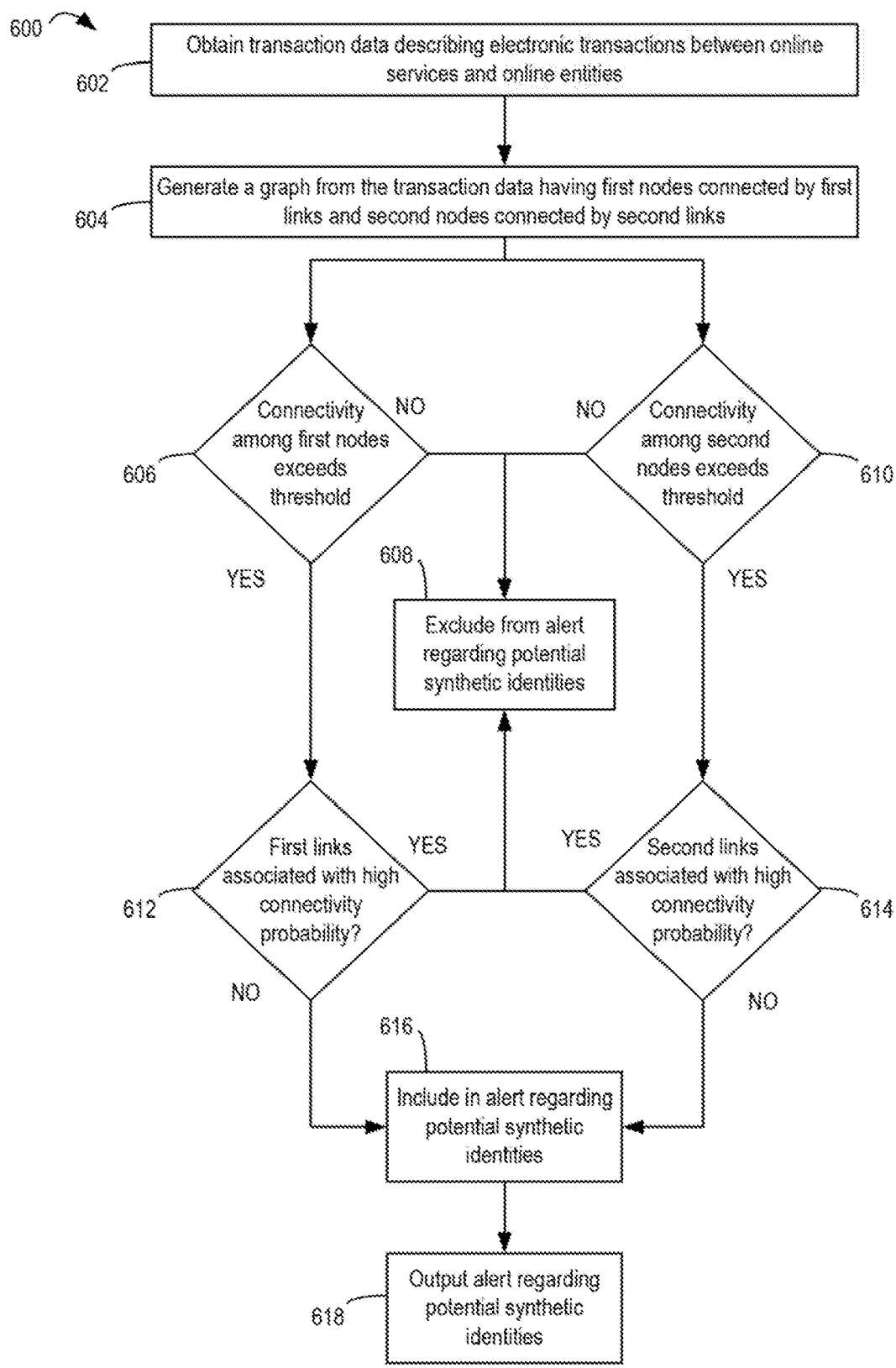
FIG. 6 is a flow chart illustrating an example of a process for detecting synthetic online entities based on activity types according to some aspects of the present disclosure.

FIG. 6 is a flow chart illustrating an example of a process for detecting synthetic online entities based on activity type according to some aspects of the present disclosure. For illustrative purposes, the process 600 is described with reference to the implementations depicted in FIGS. 1-5. Other implementations, however, are possible.

The process 600 can involve obtaining transaction data describing electronic transactions between online services and online entities, as depicted in block 602. For example, the synthetic entity detection application 100 can be executed by a suitable processing device to perform one or more operations for implementing block 602. The operations may include retrieving or otherwise accessing transaction data from a database or other suitable data structure stored in a non-transitory computer-readable medium. The transaction data may also be obtained from online services via a data network, as described above with respect to block 502 of FIG. 5.

The process 600 can also involve generating a graph from the transaction data having first nodes connected by first links and second nodes connected by second links, as depicted in block 604. For example, the synthetic entity detection application 100 can be executed by a suitable processing device to perform one or more operations for implementing block 604. The operations can include identifying entities among the transaction data and association between the entities (e.g., common geographic locations, activities involving multiple entities, etc.), as described above with respect to FIGS. 1-5.

The process 600 can also involve determining whether a connectivity among the first nodes exceeds a threshold connectivity, as depicted in block 606. The synthetic entity detection application 100 can be executed by a suitable processing device to compare the connectivity among the first nodes with a threshold connectivity. This comparison can be performed using any of the examples described above with respect to block 506.

If the connectivity among the first nodes does not exceed the threshold connectivity, the process 600 can involve excluding entities represented by the first nodes from an alert regarding potential synthetic entities, as depicted in block 608. In one example, if the synthetic entity detection application 100 determines that the connectivity among the first nodes does not exceed a threshold connectivity for a given geographic region, the synthetic entity detection application 100 can determine that the connectivity among the first nodes is more indicative of bona fide entities rather than synthetic entities. In another example, if the synthetic entity detection application 100 determines that a connectivity velocity among the first nodes does not exceed a threshold connectivity velocity, the synthetic entity detection application 100 can determine that the connectivity among the first nodes is more indicative of bona fide entities rather than synthetic entities.

The process 600 can also involve determining whether a connectivity among the second nodes exceeds a threshold connectivity, as depicted in block 610. For example, the synthetic entity detection application 100 can analyze the connectivity among the second nodes in a similar manner as described above with respect to blocks 506 and 608. If the connectivity among the second nodes exceeds the threshold connectivity, the process 600 can involve excluding entities represented by the second nodes from the alert regarding potential synthetic entities, as depicted in block 608. In some aspects, the same threshold connectivity can be used at blocks 606 and 610. In other aspects, a first threshold connectivity used at block 606 can be different from a second threshold connectivity used at block 610.

The process 600 can perform additional analysis for subsets of nodes having a connectivity exceeding a threshold connectivity. For example, if the connectivity among the first nodes exceeds the threshold connectivity, the process 600 can also involve determining whether the first links are associated with a high connectivity probability, as depicted in block 612, and determining whether the second links are associated with a high connectivity probability, as depicted in block 614. A high connectivity probability may be associated with certain types of online activities that are more likely to result in large numbers of online transactions. For instance, regular or continuous activity involving a social media account may suggest that an entity associated with the social media account is less likely to be synthetic. Alternatively, certain types of online activities may not be associated with a high connectivity probability. For example, the presence of two or more online entities co-signing on a large number of online loan applications within a short period of time may be sufficiently unusual that this type of activity indicates that the associated entities are synthetic.

If the first links are associated with a high connectivity probability, the process 600 can return to block 608, in which the online entities associated with the first nodes are excluded from the alert. Likewise, if the second links are associated with a high connectivity probability, the process 600 can return to block 608, in which the online entities associated with the second nodes are excluded from the alert.

If the first links, the second links, or both are not associated with high connectivity probability, the process 600 can also involve including the online entities associated with the first nodes, the second nodes, or both in the alert, as depicted in block 616. For example, the synthetic entity detection application 100 can be executed by a suitable processing device to perform one or more operations for implementing block 616.

The process 600 can also involve outputting the alert regarding potential synthetic entities, as depicted in block 618. For example, the synthetic entity detection application 100 can be executed by a suitable processing device to perform one or more operations for implementing block 618.

In some aspects, one or more processes described herein can be performed in a transactional manner. For example, a specific person, address, or other data or set of data indicative of an entity can be investigated. This entity can be positioned at the center of one of the graphs described herein for purposes of analysis. The entity can be analyzed (e.g., visually, algorithmically by a processing device, or some combination thereof) to determine whether the entity is within, or near, an area of hyper-connected data.

In additional or alternative aspects, one or more processes described herein can be performed in a batch processing manner. For example, a large list or other portion of a dataset (e.g., the entire dataset), can be processed algorithmically by a processing device. The processing device can identify areas of hyper-connectivity. For instance, a processing system can review a large number of clients (e.g., 20 million) of a bank or other financial institution at certain intervals (e.g., every month, at random times during a year, etc.). The processing system can determine which of these clients are in hyper-connected groups. The processing system can select these clients for further processing based on determining that these clients are in hyper-connected groups.

Figure 7:
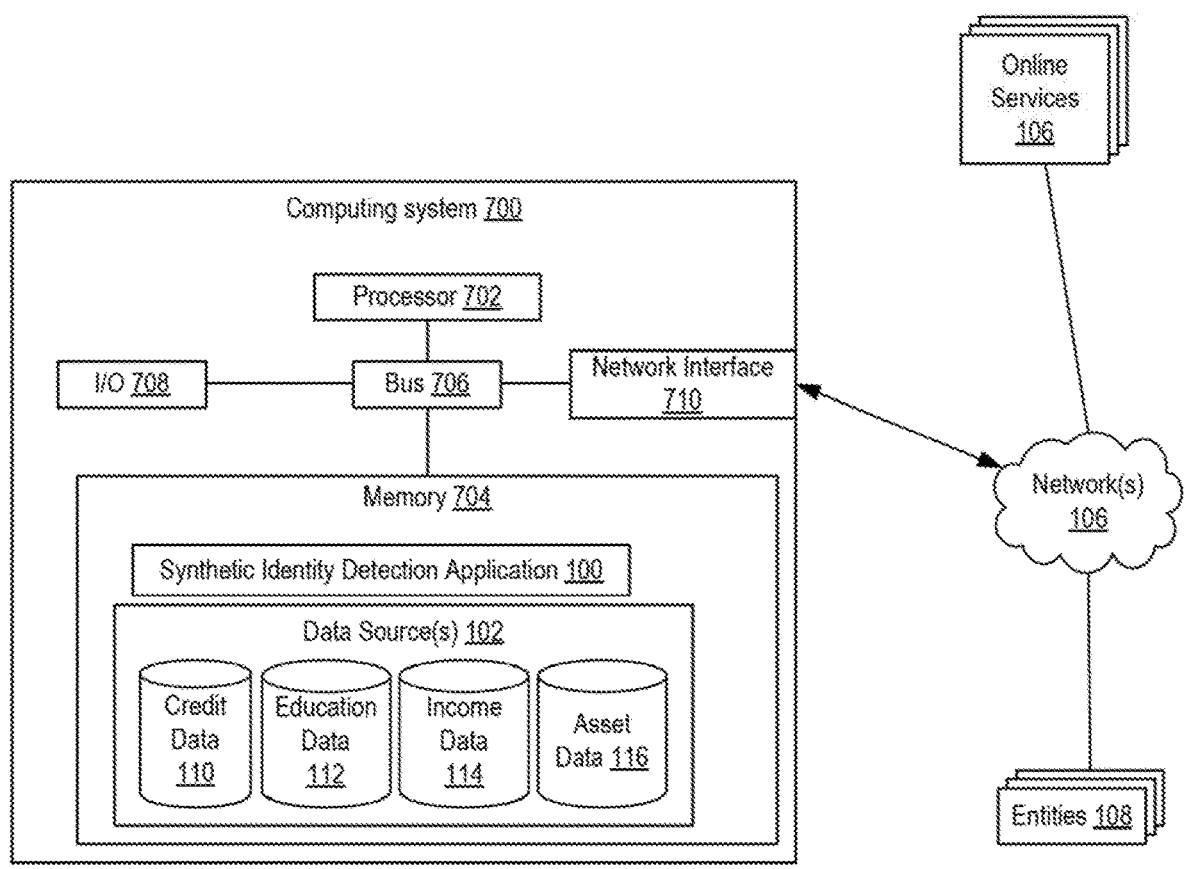
FIG. 7 is a block diagram depicting an example of a computing system for implementing certain features according to some aspects of the present disclosure.

Any suitable computing system or group of computing systems can be used to perform the operations described herein. For example, FIG. 7 is a block diagram depicting an example of a computing system 700 for implementing certain features according to some aspects.

The computing system 700 can include a processor 702 that is communicatively coupled to a memory 704 and that executes computer-executable program code stored in the memory 704, accesses information stored in the memory 704, or both. Examples of a processor 702 include a microprocessor, an application-specific integrated circuit, a field-programmable gate array, or any other suitable processing device. The processor 702 can include any number of processing devices, including one. The processor 702 can include or communicate with a memory 704 storing program code that, when executed by the processor 702, causes the processor to perform the operations described in this disclosure.

The memory 704 can include any suitable computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The computing system 700 may also include a number of external or internal devices such as input or output devices. For example, the computing system 700 is shown with an input/output interface 708 that can receive input from input devices or provide output to output devices. A bus 706 can also be included in the computing system 700. The bus 706 can communicatively couple one or more components of the computing system 700.

The computing system 700 can execute program code that includes the synthetic entity detection application 100. The program code for the synthetic entity detection application 100 may be resident in any suitable computer-readable medium and may be executed on any suitable processing device. The program code for the synthetic entity detection application 100 can reside in the memory 704 at the computing system 700. The synthetic entity detection application 100 stored in the memory 704 can configure the processor 702 to perform the operations described herein.

The computing system 700 can also include at least one network interface 710. A network interface 710 can include any device or group of devices suitable for establishing a wired or wireless data connection to one or more data networks 108. Non-limiting examples of the network interface 710 include an Ethernet network adapter, a modem, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied. For example, blocks can be re-ordered, combined, broken into sub-blocks, or some combination thereof. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method comprising:
obtaining transaction data from servers associated with online services, the transaction data identify electronic transactions involving the online services;
generating, by a processing device and from the transaction data, a graph data structure having nodes and links among the nodes, the nodes representing individuals having identities usable for accessing the online services and the links among the nodes representing at least one of (a) commonalities of geographic location for pairs of individuals or (b) completed transactions between the pairs of individuals identified from the electronic transactions involving the individuals;
determining, by the processing device, node edge densities for the nodes, wherein a node edge density indicates a node-to-link ratio among a subset of the nodes, wherein one or more of the determined node edge densities have one or more values that prevent or hinder detection of synthetic identities via a visual inspection of a graphical display of the graph data structure;
identifying, by the processing device, weights for at least some of the links among the nodes, wherein a value of a weight for a link indicates a likelihood of a type of the link being specific to an individual;
computing, by the processing device and based on the node edge densities and the weights, degrees of connectivity for respective subsets of the nodes;
computing, by the processing device, velocities for the degrees of connectivity, wherein computing a velocity for a degree of connectivity comprises determining an increase in the degree of connectivity that occurred within a specified time period;
detecting, as a potential synthetic identity, a first identity that is usable for accessing an online service and that is represented by a node in a first subset of the nodes, wherein detecting the potential synthetic identity comprises performing, by the by the processing device:
(a) determining that a first degree of connectivity among the first subset of the nodes exceeds a threshold connectivity, the first degree of connectivity indicating electronic communications involving a subset of the individuals represented by the first subset of the nodes,
(b) determining that links among the first subset of the nodes represent activity having a first likelihood of connectivity lower than a threshold likelihood of connectivity, and
(c) determining that a particular velocity for the first subset of the nodes exceeds a threshold velocity;
including, by the processing device, the first identity in an alert indicating the potential synthetic identity;
determining, by the processing device and from the links among the nodes, that a second degree of connectivity among a second subset of the nodes exceeds the threshold connectivity and that links among the second subset of the nodes represents activity having a second likelihood of connectivity greater than the threshold likelihood of connectivity;
excluding, from the alert, a second identity represented by a node in the second subset of the nodes; and
transmitting, by the processing device and to a computing device associated with the online service, the alert to prevent or delay completion of an online transaction with the online service by the potential synthetic identity.

2. The method of claim 1, wherein determining that the first degree of connectivity exceeds the threshold connectivity comprises:
   identifying a geographic region associated with the subset of the individuals;
   selecting the threshold connectivity for the geographic region; and
   comparing the first degree of connectivity for the subset of the individuals with the threshold connectivity for the geographic region.

3. The method of claim 1, wherein generating the nodes and the links among the nodes comprises:
   for each identity in a set of identities in the transaction data:
      identifying a respective subset of records from the transaction data having identifiers associated with the identity, and
      associating the identifiers with the identity in a database; and
   generating each link based on two records from the transaction data having an identifier associated with multiple individuals in the database.

4. The method of claim 1, further comprising causing a display device to display a graph having the nodes and the links among the nodes in a graphical interface, wherein transmitting the alert comprises updating the graphical interface to include a visual indicator of the first degree of connectivity exceeding the threshold connectivity.

5. A system comprising:
   a first server system configured for conducting a set of electronic transactions, over one or more data networks and via a first online service, with user devices associated with a first set of individuals with access to software applications;
   a second server system configured for conducting a transaction, over the one or more data networks and via a second online service, with a particular user device associated with a particular online identity;
   a synthetic identity detection server communicatively coupled, via the one or more data networks, to external servers associated with online services, the external servers comprising the first server system and the second server system, wherein the synthetic identity detection server is communicatively coupled to the second server system in a manner that is external to a communication connection, via the second online service, between the second server system and the particular user device; and
   a non-transitory computer-readable medium storing a graph data structure comprising nodes and links among the nodes, the nodes representing individuals having identities usable for accessing the online services, the links among the nodes representing at least one of (a) commonalities of geographic location for pairs of individuals identified from the electronic transactions or (b) completed transactions between the pairs of individuals identified from the electronic transactions;
   wherein the synthetic identity detection server is configured for:
      obtaining transaction data from the external servers via the one or more data networks, the transaction data describing the set of electronic transactions with the user devices via the first online service,
      updating the graph data structure, based on the obtained transaction data, to include the links among the nodes,
      determining node edge densities for the nodes, wherein a node edge density indicates a node-to-link ratio among a subset of the nodes, wherein one or more of the determined node edge densities have one or more values that prevent or hinder detection of synthetic identities via a visual inspection of a graphical display of the graph data structure,
      identifying weights for at least some of the links among the nodes, wherein a value of a weight for a link indicates a likelihood of a type of the link being specific to an individual,
      computing, based on the node edge densities and the weights, degrees of connectivity for respective subsets of the nodes,
      computing velocities for the degrees of connectivity, wherein computing a velocity for a degree of connectivity comprises determining an increase in the degree of connectivity that occurred within a specified time period,
      detecting, as a potential synthetic identity, a first identity that is usable for accessing an online service and that is represented by a node in a first subset of the nodes, wherein detecting the potential synthetic identity comprises performing:
         (a) determining that a first degree of connectivity among the first subset of the nodes exceeds a threshold connectivity, the first degree of connectivity indicating electronic communications involving a subset of the identities represented by the first subset of the nodes,
         (b) determining that links among the first subset of the nodes represents activity having a first likelihood of connectivity lower than a threshold likelihood of connectivity, and
         (c) determining that a particular velocity for the first subset of the nodes exceeds a threshold velocity,
      including the first identity in an alert indicating the potential synthetic identity;
      determining, from the links among the nodes, that a second degree of connectivity among a second subset of the nodes exceeds the threshold connectivity and that links among the second subset of the nodes represents activity having a second likelihood of connectivity greater than the threshold likelihood of connectivity,
      excluding, from the alert, a second identity represented by a node in the second subset of the nodes,
      transmitting the alert to the second server system to prevent or delay completion of an online transaction with the second online service by the potential synthetic identity.

6. The system of claim 5, wherein the synthetic identity detection server is configured for determining that the first degree of connectivity exceeds the threshold connectivity by performing operations comprising:
   identifying a geographic region associated with the subset of the individuals;
   selecting the threshold connectivity for the geographic region; and
   comparing the first degree of connectivity for the subset of the individuals with the threshold connectivity for the geographic region.

7. The system of claim 5, wherein the synthetic identity detection server is configured for generating the graph data structure by performing operations comprising:
   for each identity in a set of identities in the transaction data:

identifying a respective subset of records from the transaction data having identifiers associated with the identity, and associating the identifiers with the identity in a database; and generating the links among the nodes based on records from the transaction data having identifiers associated with multiple identities in the database.

8. The system of claim 5, wherein the synthetic identity detection server is further configured for causing a display device to display data from the graph data structure in a graphical interface, wherein transmitting the alert comprises updating the graphical interface to include a visual indicator of the degree of connectivity exceeding the threshold connectivity.

9. The system of claim 5, further comprising a subset of the external servers, wherein the subset of the external servers are configured for executing the electronic transactions involving the individuals and generating a subset of the transaction data based on the electronic transactions.

* * * * *